(12) United States Patent
Lee et al.

(10) Patent No.: US 6,742,937 B2
(45) Date of Patent: Jun. 1, 2004

(54) OPTICAL FIBER CONNECTOR HAVING COMPLIANT ALIGNMENT FEATURES

(75) Inventors: Nicholas A. Lee, Woodbury, MN (US); Harry A. Loder, Austin, TX (US); Larry R. Cox, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 156 days.

(21) Appl. No.: 10/022,474

(22) Filed: Dec. 18, 2001

(65) Prior Publication Data

US 2003/0113089 A1 Jun. 19, 2003

(51) Int. Cl.[7] .................................................. G02B 6/36
(52) U.S. Cl. ........................................ 385/78; 385/137
(58) Field of Search ............................ 385/78, 59, 60, 385/72, 83, 137, 114

(56) References Cited

U.S. PATENT DOCUMENTS

| | | |
|---|---|---|
| 3,864,018 A | 2/1975 | Miller |
| 4,046,454 A | 9/1977 | Pugh, III |
| 4,662,713 A | 5/1987 | Davies et al. |
| 4,830,456 A | 5/1989 | Kakii et al. ................... 385/92 |
| 5,450,517 A | 9/1995 | Essert |
| 5,548,677 A | 8/1996 | Kakii et al. ................... 385/92 |
| 5,708,741 A | 1/1998 | DeVeau |
| 5,790,731 A | 8/1998 | Deveau |
| 5,923,803 A * | 7/1999 | Bunin et al. ............... 385/78 X |
| 6,210,047 B1 * | 4/2001 | Grois et al. ................... 385/83 |
| 6,464,407 B1 | 10/2002 | Ngo et al. |

FOREIGN PATENT DOCUMENTS

| | | |
|---|---|---|
| EP | 0 324 272 A2 | 7/1989 |
| EP | 0 534 141 A1 | 3/1993 |
| EP | 0 568 382 A2 | 3/1993 |
| EP | 0 961 142 A1 | 12/1999 |
| JP | 54106246 | 8/1979 |
| JP | 01052101 | 2/1989 |
| JP | 01233405 | 9/1989 |
| JP | 05307132 | 11/1993 |
| JP | 05307133 | 11/1993 |
| JP | 09015456 | 1/1997 |

* cited by examiner

*Primary Examiner*—Phan T. H. Palmer
(74) *Attorney, Agent, or Firm*—Gregg H. Rosenblatt; Alan Ball

(57) ABSTRACT

A connector assembly for securing and optically aligning one or more optical fiber arrays, each optical fiber array having a plurality of optical fibers having an outer surface. The connector assembly includes a base having fiber receiving features configured to receive and align the plurality of optical fibers; and a retaining element that covers at least a portion of the alignment features and secures the plurality of optical fibers against the alignment features. The retaining element has a first contact surface that contacts the plurality of optical fibers, where the contact surface is able to conform to the outer surfaces of the plurality of optical fibers.

25 Claims, 8 Drawing Sheets

OPTICAL FIBER CONNECTOR HAVING COMPLIANT ALIGNMENT FEATURES

BACKGROUND OF THE INVENTION

Optical fibers are used for the transmission of optical signals. Optical fibers offer greatly increased transmission capability and transmission characteristics over traditional copper wires.

The use of optical fibers, however, does present some difficulties. Optical fibers are, in fact, conductors of light signals. To avoid losing or degrading the light signals being transmitted, there is a need for precise alignment and coupling any time optical fibers are connected to each other or to optical devices. Optic transfer efficiency is the term used to measure the ability of a connector to accurately couple the transmitted light signals.

As demands on communication media and data volume continue to increase, the advantages of using optical fiber bundles for transmission of signals across shorter distances, or for interconnecting local devices, continues to grow. With this growth has come a need to connect optical fibers accurately and economically to each other and to a multiplicity of devices.

Numerous optical cable connectors have been developed to aid in the connection of fiber optic cables. As data transmission requirements grow, single fiber connectors have given way to multiple fiber arrays, such as parallel ribbon cables, including a plurality of optical fibers.

Of considerable relevance to the problem of developing practical fiber optic connectors is the question of the optic transfer efficiency at the connector. Various factors affect the optic transfer efficiency at a connector. A key factor is axial misalignment, that is, when the connecting fiber ends are not aligned at the same linear axis. The ability to accurately align and retain fibers within a connector is an important component in obtaining and maintaining axial alignment.

Aligning the end face of a single fiber against another fiber, each having a thickness less than that of a human hair, presents formidable challenges. The problems multiply geometrically the more fibers are to be connected. As the number of fibers grow, it becomes increasingly difficult to maintain the transfer efficiency of each fiber connection in the connector. The need exists for articles and methods to improve alignment and retention characteristics of multi-fiber connectors.

SUMMARY OF THE INVENTION

The present invention relates to an article, an assembly and a method for accurately securing multiple optical fibers in a connector assembly. In particular, the present invention is directed to a novel ferrule and connector assembly that establishes fiber positions relative to grooved features for accurate alignment.

A ferrule in accordance with the present invention includes a ferrule base and a retaining element. The ferrule secures and optically aligns a plurality of optical fibers, each optical fiber having an outer surface. The fibers may be coated or uncoated. The ferrule base has alignment features, such as v-grooves, configured to receive and align the plurality of optical fibers. The retaining element covers at least a portion of the alignment features and secures the plurality of optical fibers against the alignment features. The retaining element has a contact surface that contacts the plurality of optical fibers, where the contact surface is able to conform to the outer surfaces of the plurality of optical fibers.

In exemplary embodiments, the retaining element has a hardness not greater than that of the alignment features of the ferrule block and/or not greater than that of the outer surfaces the plurality of optical fibers. The contact surface may overlap the whole or only a portion of the alignment features.

The retaining element may be a cover that mates with the base to form a ferrule or may be a pad that transmits pressure exerted by the cover or other members onto the fibers. The retaining element may include suitable materials such as Pellethane, Hytrel, or Santoprene. It also may include gels, fluid-filled bladders, or foam. In a particular embodiment, the retaining element may further include a curable adhesive to help retain the fibers and secure the ferrule.

In yet another embodiment, the retaining element may include a relatively rigid structural member and a compliant contact member, the contact member including the contact surface.

In one particular embodiment, the fibers are GGP coated fibers having about a 65 Shore-D hardness. The contact surface of the ferrule cover then has a durometer hardness equal or less than 65 Shore D.

Additional embodiments may be designed to receive multiple stacks of parallel optical arrays. The ferrule includes a base and a cover element, each having alignment features. Multiple optical fiber arrays may be stacked between the cover and the base interleaved with compliant pads.

A particular embodiment of a connector assembly for securing a plurality of optical fibers includes a base having a V-groove array that receives the plurality of optical fibers. A cover mates onto the base over at least a portion of the V-groove array and applies a retaining force upon the plurality of optical fibers. The cover has a compliant contact portion having a compression range that is equal to or greater than the expected fiber alignment height variability, wherein the compliant cover applies at least a portion of the retaining force to each one of the plurality of fibers.

DETAILED DESCRIPTION OF THE INVENTION

To correctly align an optical fiber, it is desirable to be able to control and predict the position of the waveguiding region of the fiber. Fiber alignment is often accomplished using the outer geometry of the fiber. Fiber specifications often include tight tolerances for concentricity (the accuracy in positioning the light-guiding core region in the exact center of the fiber), fiber radius and circularity.

Traditional connectors have attempted to achieve correct aligning by tightly constraining the position of the optical fibers using devices such as collars or plates. As deformations may result in misalignment, hard deformation resistant materials such as ceramics or hard plastics are used to manufacture connectors.

However, the authors of the present invention have found that such hard materials can overcompress and/or deform the optical fibers themselves. When a fiber is deformed, the ability to predict the position of the core based on the outer geometry of the fiber is lost. Typical single mode optical fibers used in communications today have a diameter of 125 micrometers and a core diameter of 9 micrometers. From these dimensions, it becomes readily apparent that even a relatively small deformation of the outer surface may cause complete misalignment of the core.

Furthermore, it has been found by the authors, that plates or collars made of such materials do not evenly distribute compressive and/or alignment forces in multi-fiber connectors.

Figure 1:
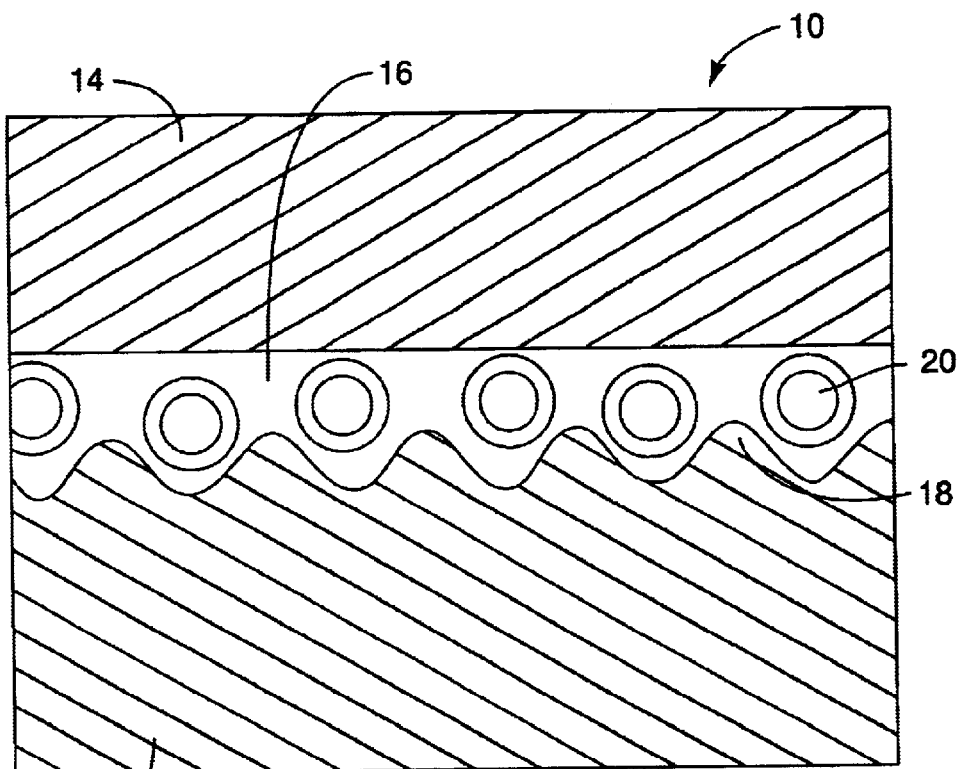
FIG. 1 is a schematic front view of a prior rigid v-groove array connector.

FIG. 1 illustrates a front view of a v-groove array connector 10 using traditional hard materials. A base 12 has an array of v-grooves 18, each v-groove receiving a fiber in an array of optical fibers 20. The v-grooves 18 provide coarse alignment based on the known radius and concentricity of the optical fibers 20. A cover 14 is placed over the fibers to retain the fibers and to force them into proper position within the v-groove 18. An adhesive 16 may be placed in the interface area to retain both the cover and the fibers in a fixed position.

Figure 2:
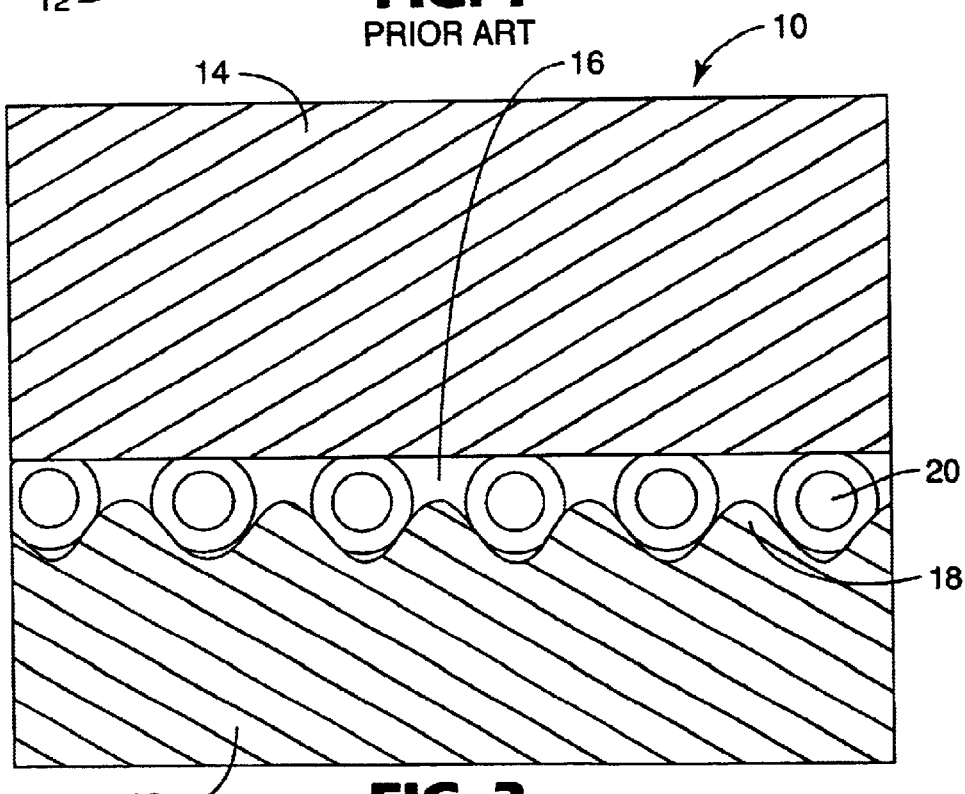
FIG. 2 is a schematic front view of an improperly deformed prior v-groove array connector.

Referring to FIG. 2, the inventors of the present invention observed that when placed on the v-grooves 18, the fibers 20 tended to "float" within the v-grooves 18. The hydraulic effect of the adhesive 16 also tended to lift the fibers 20 out of the v-grooves 18. The movement led to the fibers 20 moving out of the desired position and not being correctly aligned.

When the cover 14 is pressed upon the optical fibers 20, a number of the fibers were compressed out of position. As may be appreciated in FIG. 2, the pressure of the cover tended to deform the fibers, often resulting in damage to the fibers and misalignment.

As discussed above, having a rigid point of alignment reference may be desirable to provide repeatable positioning alignment. However, in the illustrated traditional connector systems, when both the cover 14 and the base 12 are rigid, the ferrule cover 14 may only contact the fiber array 20 at the two highest points. Therefore, the aligning pressure is not evenly distributed upon each fiber. Many of the fibers in the fiber array are not pressed into contact with the v-groove array and thus not accurately aligned. Since the ferrule cover 14 has a hardness substantially higher than that of the fiber array and/or the v-groove array, the surfaces of the fibers or the v-grooves may be deformed in an indeterminate manner, thus again preventing accurate alignment.

FIGS. 3–6 illustrate a connector 100 in accordance with the present invention. The connector 100 has a ferrule block 110 having a base 112 and a cover 114. While the ferrule 110 is illustrated as being part of an optical fiber connector, it also may be used to retain optical fibers in a variety of optical devices. Each fiber 122 in a parallel fiber array 120 is pressed into respective v-grooves 118 without significant deformation to either the fiber or the v-groove surface, thus, enabling accurate alignment. A pad 130 is disposed between the cover 114 and the optical fiber array 120. In aligning the fiber array 120 within the v-groove array 118, the pad 130 presses each individual optical fiber 122 into a matching v-groove to establish its position relative to the ferrule and ensure proper alignment. In aligning the fibers within the v-groove array, the relative hardness of the three alignment elements, namely the v-groove array 118, the fiber array 120, the pad 130, and the ferrule cover 114 play an important role in the accuracy of the alignment.

Figure 4:
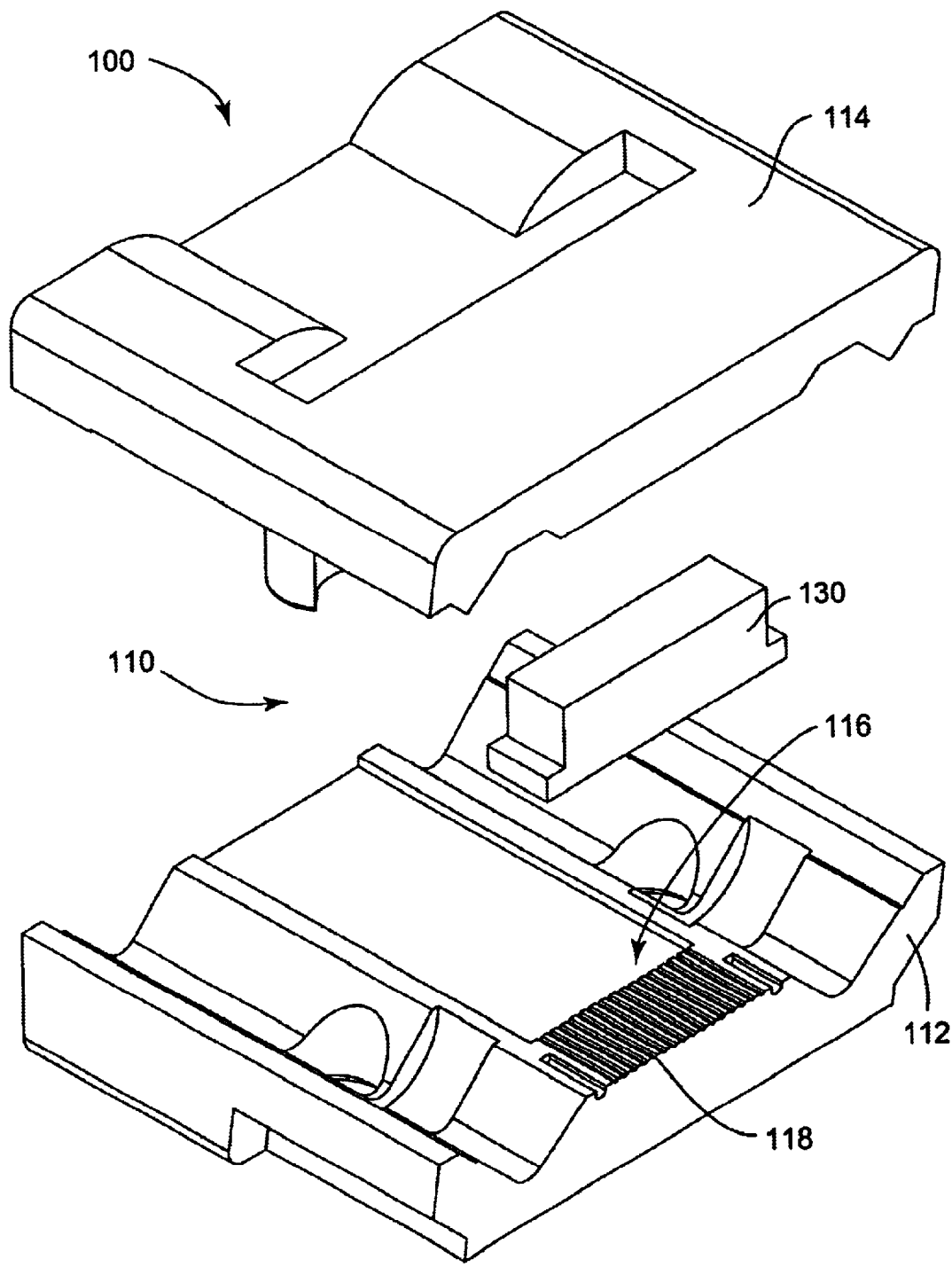
FIG. 4 is a perspective view of the first embodiment of a connector according to the present invention illustrated in FIG. 3.
Figure 5:
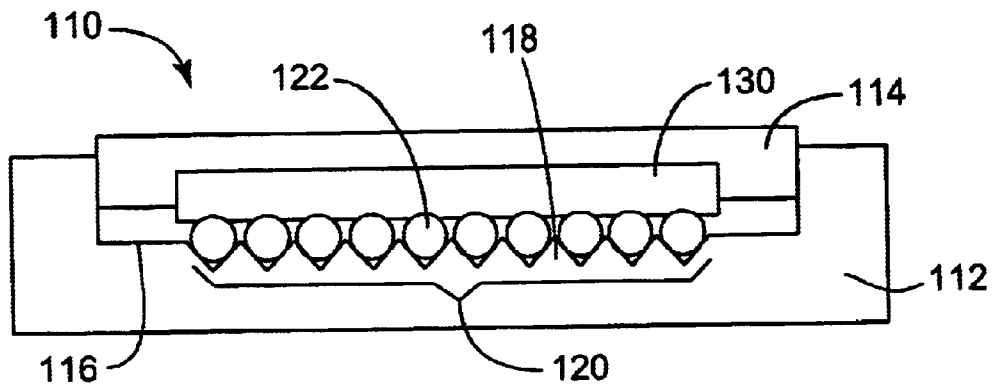
FIG. 5 is a schematic front view of the first embodiment illustrated in FIG. 4.
Figure 6:
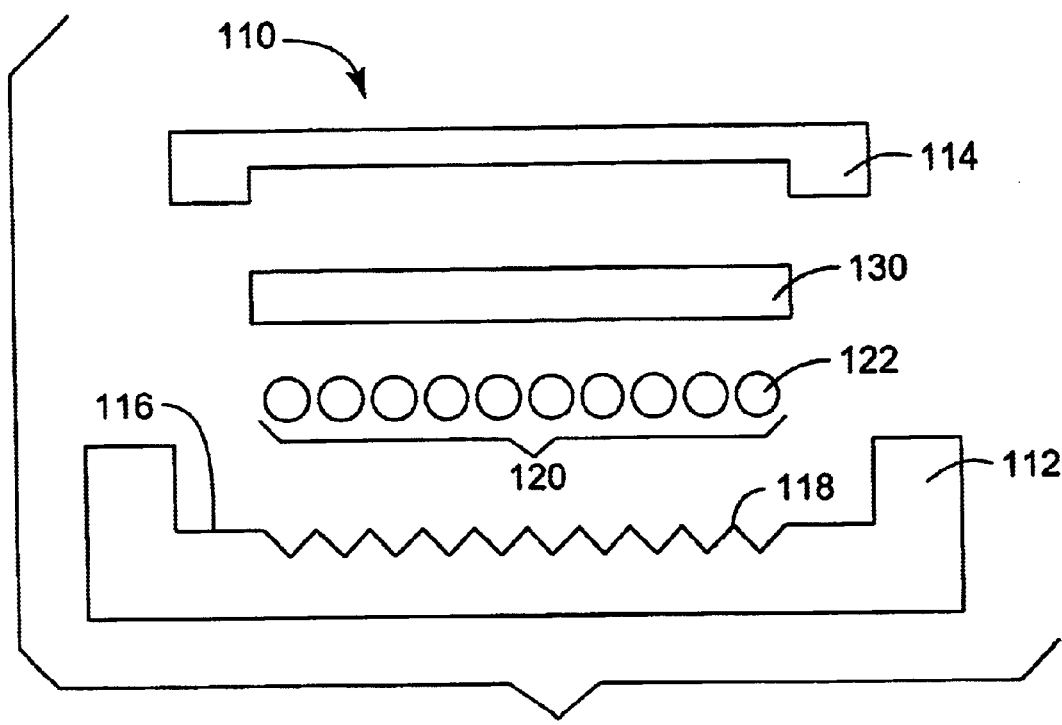
FIG. 6 is a schematic exploded front view of the first embodiment illustrated in FIG. 4.

FIG. 4 is a perspective view of the connector 100, a first embodiment of the present invention. The connector 100 includes a ferrule 110 that retains the parallel optical fiber array 120 having the plurality of fibers 122 (not shown in this Figure). The fibers may be glass fibers having outer coatings, bare glass, polymer fibers, or other types of fibers requiring alignment. FIGS. 5 and 6 are cross-sectional schematic views of the ferrule 110. The ferrule 110 includes a base 112 and a cover 114. The base 112 includes a fiber-receiving surface 116 having a plurality of fiber receiving v-grooves 118 at a connecting end. The v-grooves 118 may be made from a variety of materials including ceramics, such as alumina, zirconia, Invar, etc. The v-grooves 118 also may be made from engineered thermoplastics such as Ultem by GE Plastics or Fortron by Ticona. These plastics may be loaded with silicon or mineral fillers to enhance their mechanical properties. The exact dimensions of the v-grooves 118 are determined by the expected radius of the optical fibers 122 to be aligned. There will be at least as many v-grooves as optical fibers. The cover 114 is designed to mate with the base 112, and includes alignment and mating features. In the present embodiment, a pad 130 is interposed between the base 112 and the cover 114.

The pad 130 is a deformable element. The material for the pad 130 is selected to exhibit a balance between mechanical strength in applying a downward load on all of the fibers and compliance for the forming around each fiber. The hardness of the pad is selected to provide a degree of deformation commensurate with factors such as the hardness of the fibers, the size of the fibers, and the expected distance of protrusion of the fibers from the v-grooves.

The pad 130 has a hardness that is not greater, i.e., less or substantially equal, than that of the outer surface of the optical fibers 122 to be secured by the connector 110. In the present embodiment, since the rigid cover 114 may provide mechanical strength, the pad 130 may be substantially softer than either the optical fibers 122 or the hard cover 114. The hardness of the surface of the optical fibers 122 may be selected to be less than or equal to the hardness of the v-grooves 118. In the present exemplary embodiment, the fibers 120 are GGP coated fibers available from Minnesota Mining and Manufacturing (3M) from St. Paul, Minn. having a coating hardness of approximately 65 shore-D. GGP fiber provides superior mechanical performance by replacing the outermost surface of the fiber with a polymeric layer, thus improving the strength and bend resistance of the fiber. However, it should be noted that the present invention also may be applied to industry standard all-glass fibers, such as SMF-28 made by Corning, of Corning, N.Y. Both the cover 114 is formed of Ultem available from GE Plastics having a hardness of 110 Rockwell M. The base 112 and the cover 114 have a sufficient hardness to withstand a polishing process. The connector 100 shown in FIG. 4 has a base 112, and the v-grooves 118, made from a ceramic (e.g., alumina, zirconia)

The pad 130 is made of Pellethane from Dow Chemical having a hardness of 70 Shore A. Other suitable materials for the pad 130 include Hytrel from Dupont (www.dupont.com), and Santoprene from Advanced Elastomer Systems.

The pad is a cohesive member in that it maintains its structural cohesion and does not flow out of the connector. The pad 130 may further comprise other materials that provide compliance without losing their unitary structure, such as cross-linked gels, liquid or gas-filled bladders, foam, and other suitable materials.

Figure 3:
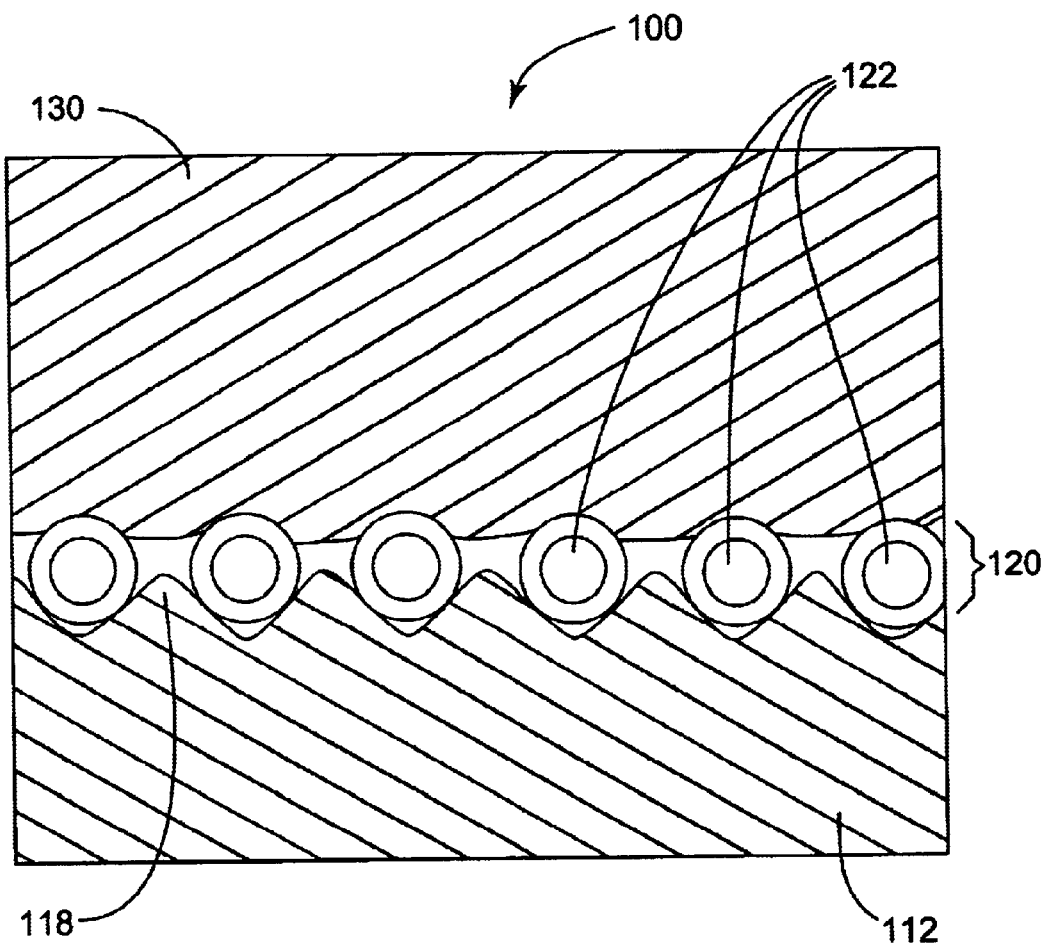
FIG. 3 is a schematic front view of a properly deformed v-groove array connector in accordance with the present invention.

As illustrated in FIG. 3, the pad 130 deforms about the circumference of each one of the optical fibers 122, while applying downward force on each one of the fibers 122. As pressure is applied to the entire fiber array 120, this causes each fiber 122 to be properly seated within the respective v-groove 118. Furthermore, as the pad 130 is softer than the outer surface of the fibers 122, the cover 114 may apply significant downward pressure without damaging the optical fiber array 120. Excess pressure may be compensated for by the deformation of the pad 130.

In alternative embodiments, the pad 130 may be sized to be smaller than the available space between the base 112 and the cover 114 to allow for sideways expansion caused by the compressive forces.

FIGS. 3–6 also illustrate a method of aligning optical fibers within a connector assembly. The connector assembly 100 having the base 112 having the plurality of fiber receiving features, such as v-grooves 118, is first provided. The parallel optical array 120 is placed on base 112 and the individual fibers 122 are grossly aligned within the receiving features 118.

A challenge when aligning optical fibers into a parallel array is that a traditional rigid horizontal cover may only apply pressure on the two highest point along the normal plane to the alignment plane. In the present case, a retaining element 130 having a compliant contact portion applies pressure on the optical fibers, the compliant contact portion deforming about the optical fibers 122. The compliant portion has a compression range that is equal to or greater than the expected fiber alignment height variability. The compliant portion applies at least a portion of the retaining force to each one of the plurality of fibers 122, seating each individual fiber in a respective alignment position in a receiving feature.

Figure 7:
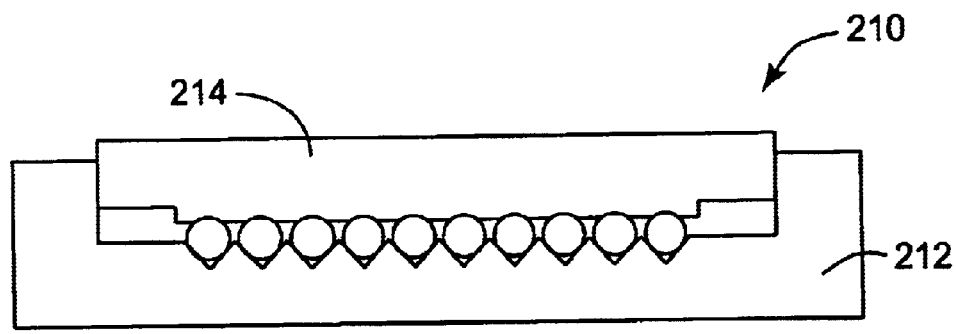
FIG. 7 is a schematic front view of a second embodiment of a v-groove array connector according to the present invention.
Figure 8:
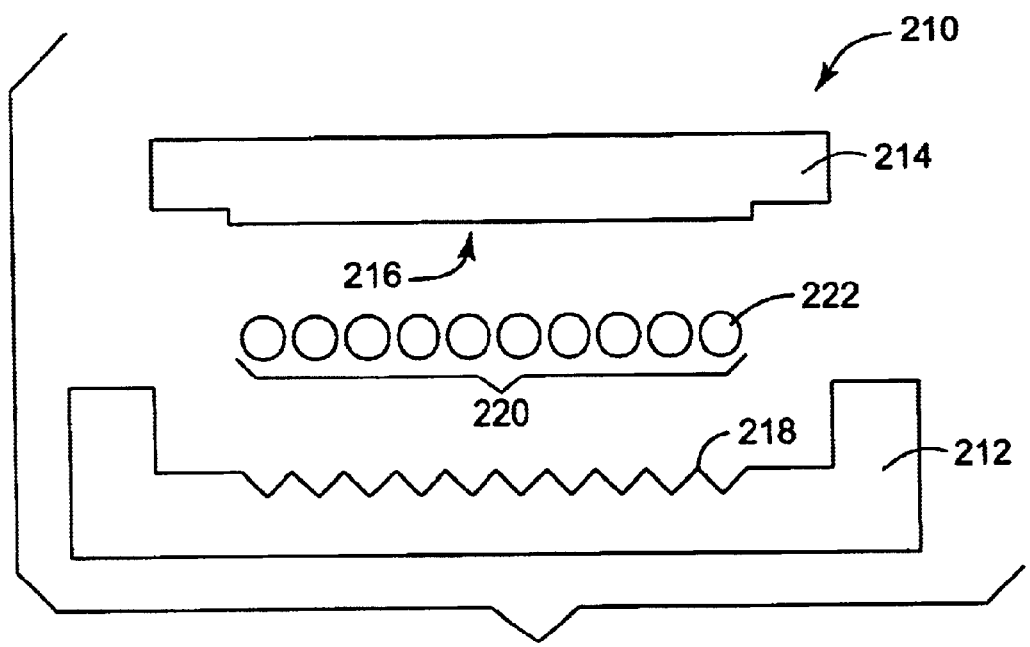
FIG. 8 is a schematic exploded front view of the second embodiment illustrated in FIG. 7.

The retaining element 130 may be a pad or may be a cover (as illustrated in FIGS. 7 and 8). The retaining element may mate to the base or may be held down by an additional member. Alternatively, adhesives may be added to cure the fibers into the correct alignment position.

In still another embodiment of the current invention, the retaining element, including the compliant contact member can be used to secure the plurality of optical fibers in alignment within the V-groove array of the base while a curable adhesive solidifies around the fibers. This cured adhesive then retains the fibers relative to the base and the retaining element may be removed.

FIG. 7 and FIG. 8 illustrate a connector 210, a second embodiment of the present invention. The connector 210 includes a base 212, configured to receive a fiber array 220, having a plurality of fibers 222, along a receiving v-groove array 218 and retained by a cover 214. The cover 214 includes a fiber contact surface 216 along the area to be in contact with the optical fibers 220.

As illustrated in FIG. 7, the contact surface 216 of the cover 214 has a hardness less than that of the optical fibers 220, allowing the surface area 216 to deform about the circumference of the optical fibers. In a particular embodiment, the fibers are 3M GGP having a coating hardness of approximately 65 Shore-D hardness.

The degree of deformation of the cover preferably accounts for factors such as the compliance relationship between thickness, hardness, downward force and fiber diameter, fiber protrusion, and expected fiber alignment height variability (the tops of the fibers when they are in the grooves). In the present embodiment, the contact surface 216 of the cover 214 has a Shore-D hardness of less than 65. A specific embodiment has a Pellethane cover having a 50 Shore-D hardness. The cover 214 may be made of a unitary composition of other materials such as Hytrel, Santoprene, and silicone. Alternatively, the cover may include a harder outer layer made of materials such as zirconia or alumina, and a softer contact layer along the contact area 216.

By using a compliant contact surface 216, sufficient force may be applied to press all the fibers 220 of the fiber array into their perspective v-grooves. The ferrule cover 214 deforms prior to deforming either the fibers 220 or the v-grooves 218. Thus, the fibers 220 are seated in the v-grooves 218 with their geometry intact and thereby accurately aligned.

Figure 9:
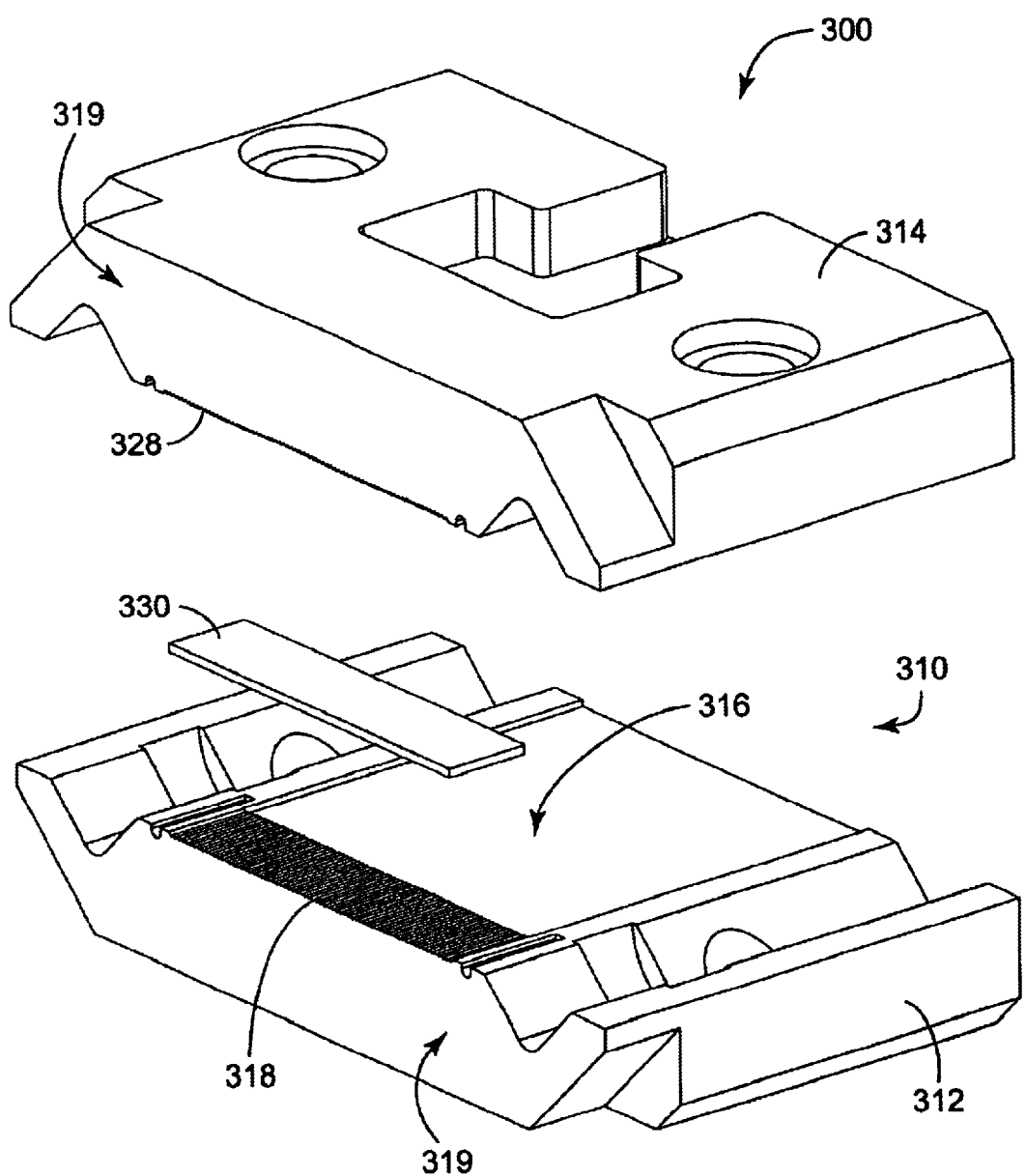
FIG. 9 is a perspective view of a third embodiment of a connector according to the present invention.
Figure 10:
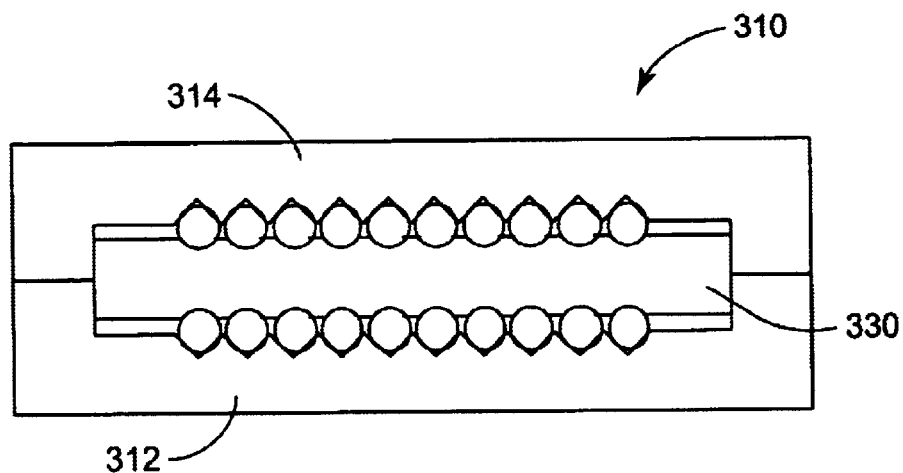
FIG. 10 is a schematic front view of the third embodiment illustrated in FIG. 9.
Figure 11:
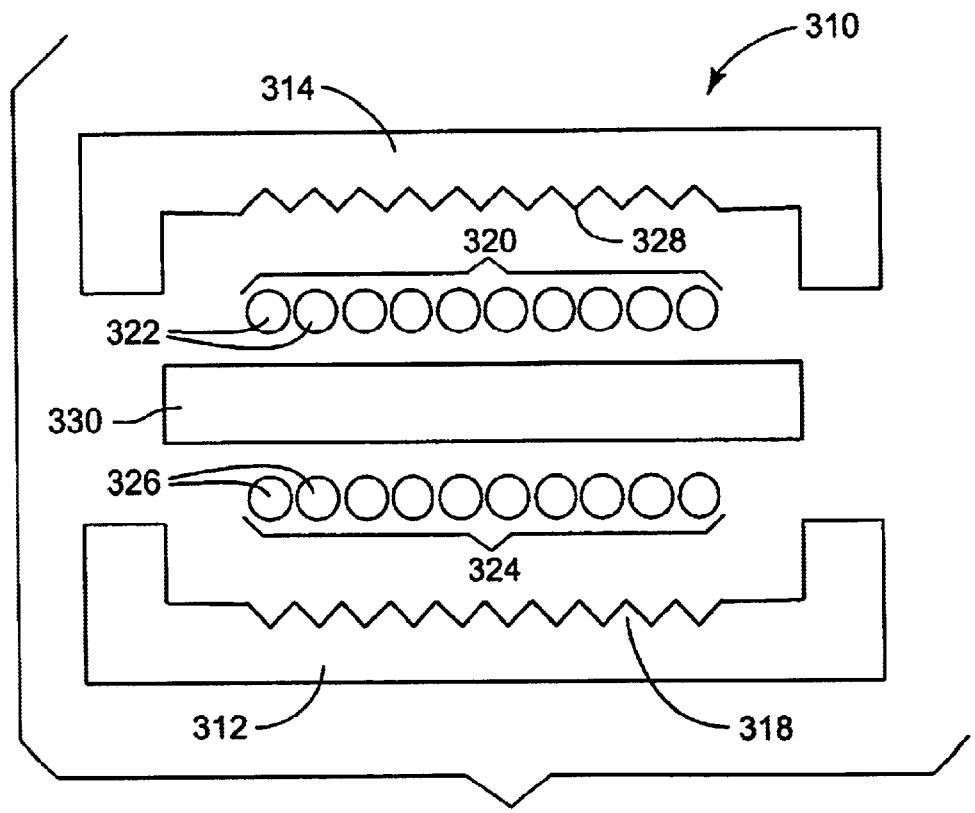
FIG. 11 is a schematic exploded front view of the third embodiment illustrated in FIG. 9.

FIGS. 9, 10, and 11 illustrate a connector 300 having a ferrule 310, a third embodiment of the invention. The ferrule 310 includes a ferrule block or base 312 and a cover 314. The base 312 includes a fiber receiving area 316 having a plurality of v-grooves 318 defined adjacent a connecting end 319. The connecting end 319 is the face that mates with the opposing face of a corresponding optical fiber connector or optical fiber device. The cover 314 has mating features for it to align and mate with the base 312. In the present embodiment, the cover 314 includes a second v-groove array 328 adjacent the connecting end 319 of the connector 310.

A pad 330 is interposed between the base 312 and the cover 314. The pad 330 is a unitary member that does not flow out of the connector. The pad 330 has a compression range that is equal to or greater than the expected fiber alignment height variability, wherein the compliant cover applies at least a portion of the retaining force to each one of the plurality of fibers. In this and the other described embodiments, the pads may include cross-linked gels, foam, fluid-filled bladders, and soft plastics. The material of the pads may be a solid adhesive to secure the ferrule elements and the fiber arrays together. Additional adhesives also may be used to secure the fibers once they are pressed into the correct seating alignment.

As better seen in FIGS. 10 and 11, the connector 310 accommodates a first-fiber array 320 including a plurality of fibers 322 and a second parallel fiber array 324 including a plurality of fibers 326. As in the previous embodiments, the pad 330 comprises materials having a hardness less than that of the optical fibers.

Figure 12:
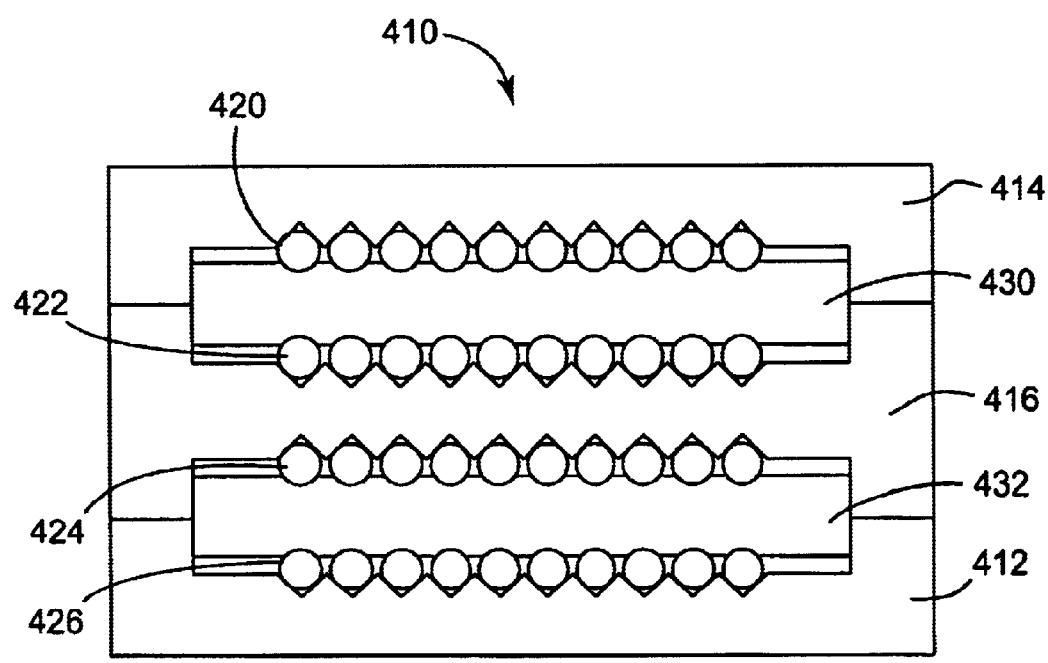
FIG. 12 is a schematic front view of a forth embodiment of a connector according to the present invention.

FIG. 12 illustrates a fourth embodiment of the present invention, a connector 410. The connector 410 includes a base 412, a cover 414, and intermediate fiber retaining piece 416 and two pads 430 and 432. The connector 410 may accommodate four parallel optical fiber arrays 420, 422, 424, and 426. Again, the characteristics of the cover, the fiber, the v-grooves, and the pads are selected for the proper mix of hardness for position ability and softness for deflection.

The present invention allows for the fibers to be securely seated and retained within aligning features, such as v-grooves, without damaging the fibers. The compliance of the pressing element allows for the fibers to be pressed into their desired aligned positions, while the relatively hard aligning features provide a stable reference for alignment.

While the present invention has been described with a reference to exemplary preferred embodiments, those skilled in the art will recognize that it may be applied to a variety of optical connector designs and that the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. A ferrule for securing and optically aligning a plurality of optical fibers, each optical fiber having an outer surface, the ferrule comprising:
   a) a ferrule base having alignment features configured to receive and align the plurality of optical fibers;
   b) a retaining element that covers at least a portion of the alignment features and secures the plurality of optical fibers against the alignment features, the retaining element having a contact surface that contacts the plurality of optical fibers, where the contact surface is able to conform to the outer surfaces of the plurality of optical fibers; and
   c) a cover element having alignment features, wherein the ferrule is designed to receive at least a first and a second parallel array of optical fibers, the first array being retained between the ferrule base and the retaining element and the second array being retained between the retaining element and the cover element.

2. The ferrule of claim 1, the ferrule cover including a relatively rigid structural member and a compliant contact member, the contact member including the contact surface.

3. The ferrule of claim 2, the compliant contact member comprising a compliant material layer.

4. The ferrule of claim 2, the compliant contact member having a hardness less than or equal to that of the alignment feature of the ferrule base.

5. The ferrule of claim 2, the compliant contact member having a hardness less than or equal to that of the outer surface of said optical fibers.

6. The ferrule of claim 2, the compliant contact member comprising a cohesive member.

7. The ferrule of claim 2, the compliant contact member comprising gels, bladders, or foam.

8. The ferrule of claim 2, the compliant contact member comprising an adhesive gel.

9. A connector assembly including the ferrule of claim 2.

10. The ferrule of claim 1, the contact surface comprising gels, bladders, or foam.

11. The ferrule of claim 1, the contact surface comprising an adhesive.

12. The ferrule of claim 1, wherein said retaining element has a hardness not greater than that of the alignment features of the ferrule base.

13. The ferrule of claim 1, wherein said retaining element has a hardness not greater than that of the outer surfaces the plurality of optical fibers.

14. The ferrule of claim 1, wherein said retaining element has a hardness not greater than that of the alignment features of the ferrule block and not greater than that of the outer surfaces the plurality of optical fibers.

15. The ferrule of claim 1, wherein said contact surface covers only a portion of the alignment features.

16. The ferrule of claim 1, the cover comprising one or more of the following materials: Pellethane, Hytrel, or Santoprene.

17. The ferrule of claim 1, the cover having a hardness less than or equal to that of the alignment features.

18. The ferrule of claim 1, the cover having a hardness less than or equal to that of the outer surface of said optical fibers.

19. The ferrule of claim 1, wherein the alignment features comprise a parallel V-groove array.

20. The ferrule of claim 1, the contact surface of the retaining element having a durometer hardness equal or less than 65 Shore D.

21. A connector assembly including the ferrule of claim 1.

22. A connector assembly for securing a plurality of optical fibers, the connector assembly comprising:
   a) a base having a V-groove array that receives the plurality of optical fibers;
   b) a cover that mates onto the base over at least a portion of the V-groove array and applies a retaining force upon the plurality of optical fibers; and
   c) a cover that mates to the base, wherein the retaining element is disposed between the cover and the base, the cover comprising fiber receiving features and the retaining element including a second contact surface on an opposite face, wherein the connector assembly receives a first array of optical fibers between the base and the retaining element and a second array of optical fibers between the retaining element and the cover.

23. The connector assembly of claim 22, further comprising a plurality of retaining elements interposed between the cover and the base, wherein the connector assembly is configured to receive a plurality of optical fiber arrays stacked between the plurality of retaining elements.

24. The connector assembly of claim 22, wherein the retaining element has a hardness less than that of the outer surface of the optical fibers.

25. The connector assembly of claim 22, wherein the retaining element comprises a gel, solid adhesives, bladder elements, silicone, plastics or foam.

* * * * *

UNITED STATES PATENT AND TRADEMARK OFFICE
CERTIFICATE OF CORRECTION

PATENT NO. : 6,742,937 B2
DATED : June 1, 2004
INVENTOR(S) : Lee, Nicolas A.

It is certified that error appears in the above-identified patent and that said Letters Patent is hereby corrected as shown below:

Column 7,
Line 42, delete "ferrule cover" and insert in place thereof -- retaining element --
Line 44, insert -- complaint -- before "contact member";
Line 49, delete "feature" and insert in place thereof -- features --

Column 8,
Line 31, after "securing" insert -- and optically aligning one or more optical fiber arrays, each optical fiber array comprising --;
Line 32, after "fibers" insert -- having an outer surface --;
Line 33, delete "a V-groove array that receives" and insert in place thereof -- fiber alignment features configured to receive and align --;
Lines 36-38, delete "a cover that mates onto the base over at least a portion of the V-groove array and applies a retaining force upon the plurality of optical fiber; and" and insert in place thereof -- a retaining element that convers at least a portion of the feature, the retaining element having a first contact surface that contacts the plurality of optical fibers, where the first contact surface is able to conform to the outer surfaces of the plurality of optical fibers; and --;
Line 56, delete "a".

Signed and Sealed this

Ninth Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,742,937 B2
DATED : June 1, 2004
INVENTOR(S) : Lee, Nicolas A.

It is certified that error appears in the above-identified patent and that said Letters Patent is hereby corrected as shown below:

Column 7,
Line 42, delete "ferrule cover" and insert in place thereof -- retaining element --
Line 44, insert -- compliant -- before "contact member";
Line 49, delete "feature" and insert in place thereof -- features --

Column 8,
Line 31, after "securing" insert -- and optically aligning one or more optical fiber arrays, each optical fiber array comprising --;
Line 32, after "fibers" insert -- having an outer surface --;
Line 33, delete "a V-groove array that receives" and insert in place thereof -- fiber alignment features configured to receive and align --;
Lines 36-38, delete "a cover that mates onto the base over at least a portion of the V-groove array and applies a retaining force upon the plurality of optical fiber; and" and insert in place thereof -- a retaining element that covers at least a portion of the alignment features and secures the plurality of optical fibers against the alignment features, the retaining element having a first contact surface that contacts the plurality of optical fibers, where the first contact surface is able to conform to the outer surfaces of the plurality of optical fibers; and --;
Line 56, delete "a".

This certificate supersedes Certificate of Correction issued November 9, 2004.

Signed and Sealed this

Nineteenth Day of April, 2005